(12) United States Patent
Lim et al.

(10) Patent No.: US 8,086,625 B2
(45) Date of Patent: Dec. 27, 2011

(54) AUTOMATED METHOD FOR RE-ATTRACTING JOB SEEKERS TO JOB MATCH SITE AT MORE OPPORTUNE TIMES

(75) Inventors: Dion M. Lim, Piedmont, CA (US); James Levine, Mountain View, CA (US)

(73) Assignee: Simply Hired, Inc., Mountain View, CA (US)

( * ) Notice: Subject to any disclaimer, the term of this patent is extended or adjusted under 35 U.S.C. 154(b) by 695 days.

(21) Appl. No.: 12/183,484

(22) Filed: Jul. 31, 2008

(65) Prior Publication Data
US 2010/0030743 A1    Feb. 4, 2010

(51) Int. Cl.
    *G06F 17/30* (2006.01)
(52) U.S. Cl. ...... 707/769; 707/758; 705/7.29; 705/7.31; 705/7.32
(58) Field of Classification Search .......... 707/758, 707/769, 999.003, 999.01, 999.107; 705/7.29, 705/7.31, 7.32
    See application file for complete search history.

(56) References Cited

U.S. PATENT DOCUMENTS

| | | |
|---|---|---|
| 5,671,409 A | 9/1997 | Fatseas et al. |
| 2003/0188217 A1 | 9/2003 | Vianello |
| 2006/0085455 A1* | 4/2006 | Chmura et al. ............... 707/100 |
| 2006/0122875 A1* | 6/2006 | Kolbe ............................... 705/8 |
| 2006/0229896 A1 | 10/2006 | Rosen et al. |
| 2006/0265270 A1* | 11/2006 | Hyder et al. ..................... 705/9 |
| 2006/0282301 A1* | 12/2006 | Olson ............................... 705/9 |
| 2008/0065633 A1 | 3/2008 | Luo et al. |
| 2009/0164311 A1* | 6/2009 | Deyo ............................. 705/11 |
| 2009/0177518 A1* | 7/2009 | Adams et al. .................... 705/9 |
| 2009/0228323 A1* | 9/2009 | Ebrahimian ..................... 705/9 |

OTHER PUBLICATIONS

"Career Literacy Portal Research Project" Lyceum Group, http://www.cmu.edu/ced/publications/ciportal.pdf, Jan. 13, 2004.
International Search Report, PCT/US09/52252, mailing date Sep. 15, 2009.
Written Opinion of the International Searching Authority, PCT/US09/52252.

* cited by examiner

*Primary Examiner* — Leslie Wong
(74) *Attorney, Agent, or Firm* — Haynes and Boone, LLP

(57) ABSTRACT

A machine-implemented method encourages a job seeker to revisit a job search site by (a) automatically submitting the seeker's search query to a job history database to selectively retrieve responsive job history information corresponding to the seeker's search query; (b) automatically forwarding the selectively retrieved job history information for a prediction of future job prospects; and (c) automatically generating from the future job prospects results which indicate future time points at which more or better job search results are expected to be available.

19 Claims, 4 Drawing Sheets

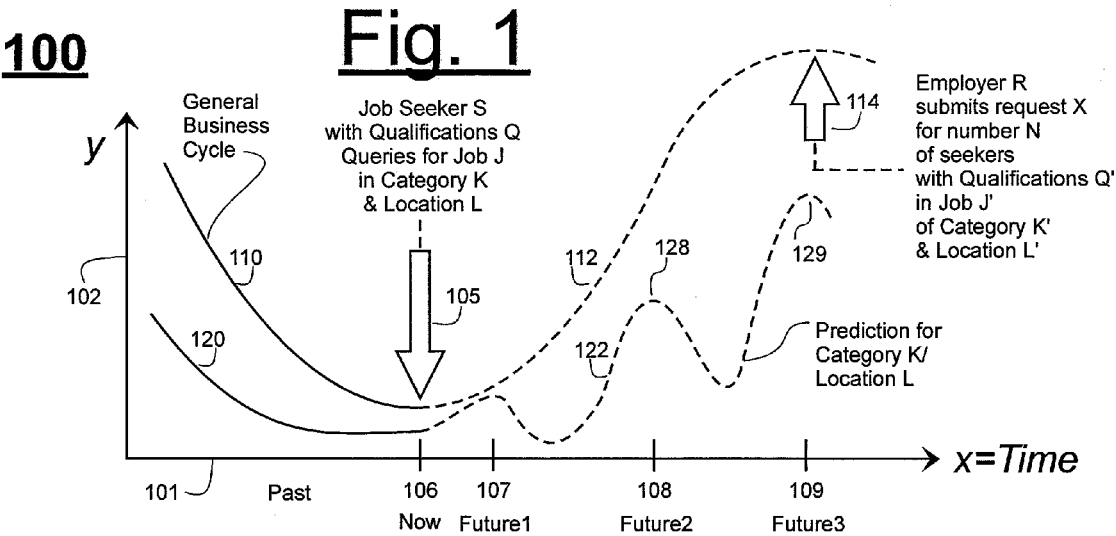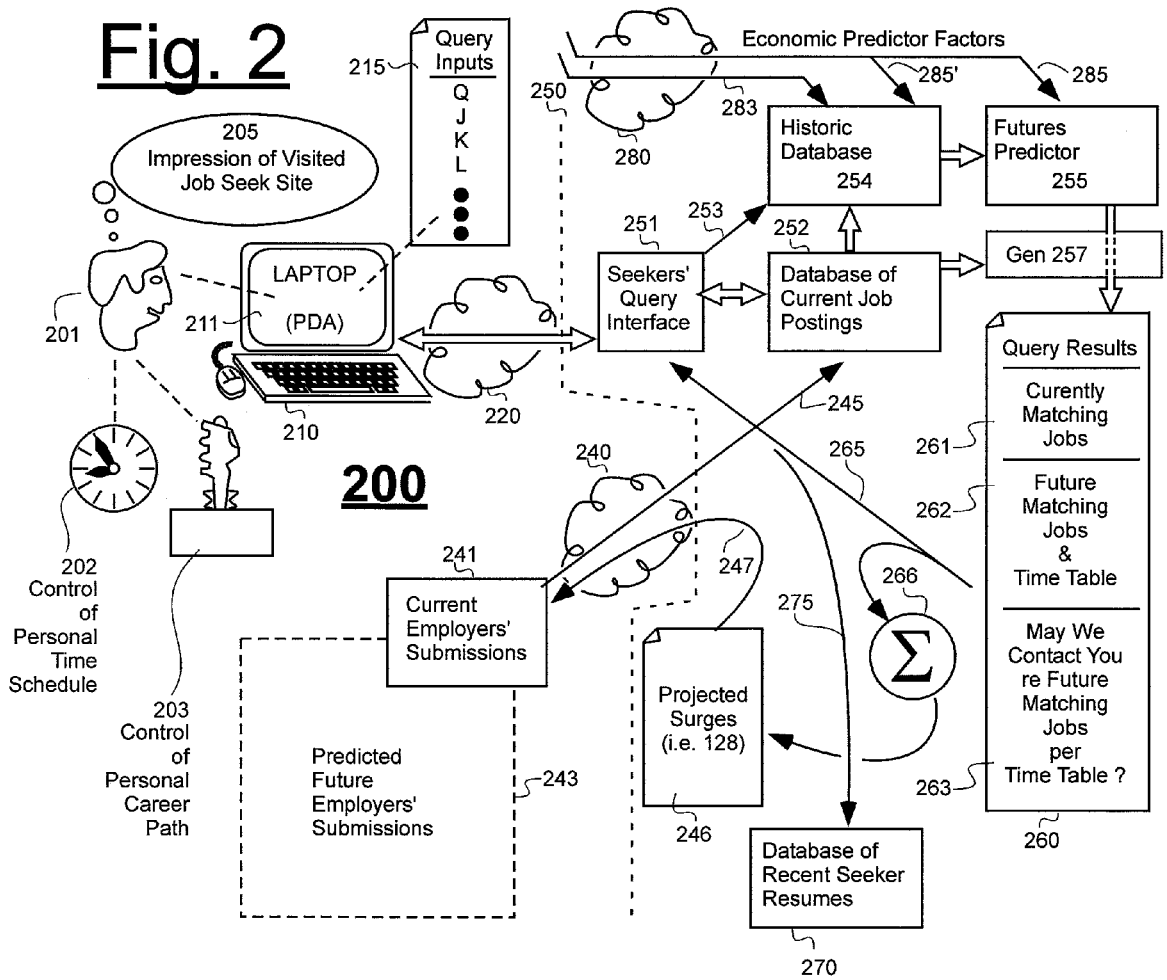

AUTOMATED METHOD FOR RE-ATTRACTING JOB SEEKERS TO JOB MATCH SITE AT MORE OPPORTUNE TIMES

FIELD OF DISCLOSURE

The present disclosure of invention relates generally to network accessible nodes (e.g., internet accessible websites) that provide automated matching services for potential employees (job seekers) and employers (job offerors). The disclosure relates more specifically to the timing of when job seekers visit employee-employer matching nodes to seek positions and job offerors visit employee-employer matching nodes to submit requests for job candidates.

DESCRIPTION OF RELATED TECHNOLOGY

Internet sites that provide automated employee-employer matching services are well known. An advantage of such sites (or alike network nodes) is that employers seeking qualified employees and job seekers seeking skill-matched employment can find each other easily, electronically over the internet and they can conduct initial screening of one another without need for exchange of physical papers or resort to expensive manual travel or face to face interviews.

A disadvantage of employee-employer matching sites however, is that there are so many such sites (nodes). Job seekers who seek employment often need to visit and spend time at many of the various sites only to be disappointed in many of their navigational trips (virtual trips) because they have not yet found a site that seems to provide good opportunities in the job seeker's specific field of endeavor.

Employers who are seeking qualified employees have similar troubles. The job offerors (employers) frequently have to distribute their requirements submissions to many job-match sites (or other such nodes) only to be disappointed with a return of too many under-qualified resumes from some sites or too few numbers of qualified responses from other sites, especially in economic boom times when the offerors need the largest numbers of per-qualified employees but are caught short handed because they did not anticipate the change of climate in their specific business sector.

SUMMARY

A method in accordance with the present disclosure of invention encourages job seekers to revisit a given job-match node at more opportune times (or to approve being automatically alerted by the job-match node at such more opportune times) when more jobs matching their qualifications and desires are likely to be available. Similarly, the method may encourage job offerors to submit requests for qualified job candidates to the node at times preceding an anticipated boom so that the offerors do not find themselves at the wrong side of the business cycle, after most good job candidates have been snatched up by competitors. In one embodiment, the encouragement to job seekers includes the step of automatically providing job seekers with a future casting report that indicates when, where and/or what kinds of jobs are expected to be available in the near future, where the predicted jobs better match the seeker's particular qualifications and desires. In one embodiment, the encouragement to job offerors to submit job offers includes providing the job offerors with future casting reports that indicate when and what kinds of job candidates are expected to be in demand but in short or ample supply in the near future, where those candidates match the job offeror's specific business requirements. A prediction engine generates the future casting reports for the job seekers and job offerors.

In one embodiment, emails or other push type advisements are automatically sent to consenting job seekers as the time draws near to remind them to revisit the job matching node (e.g., internet site) at the more opportune times when more matching jobs are expected to be available at that node for their given skills. The advisements identify specific times when it is expected that the job seeker's database query submission to that node will provide results that are more in tune with the seeker's personal goals. In one variation, the push type advisement includes job search results automatically run for that job seeker at the more opportune time based on an early job search query submitted by the same seeker at an earlier, but less opportune time. Thus, a job seeker who was disappointed with initial results provided by the given node, perhaps because the market was bad at the time of a first query, is nonetheless encouraged to re-visit and/or otherwise re-use the node at a more opportune time rather than being allowed to leave the node with the impression that this node does not and will never meet the seeker's needs.

A method in accordance with the disclosure includes the machine-implemented steps of enabling a user to submit a job seeking query via a first interface device and enabling the user to receive a corresponding future jobs prediction via the same first interface device or via another such interface device.

A network-accessible job match node in accordance with the disclosure comprises: (a) an economically-directed history database that is structured to receive query parameters from a user's (e.g., job seeker's) search query and to responsively selectively retrieve economically-directed historic information (e.g., matched job trends) corresponding to the received query parameters, said retrieved information being useful for generating a prediction of future economic activity (e.g., matched future job trends) corresponding to the received query parameters; (b) a futures predicting engine that is coupled to the history database and configured to receive the retrieved economically-directed historic information and to generate therefrom a prediction of future economic behavior (e.g., expected numbers of matched future jobs); and (c) a report generator that is coupled to the futures predicting engine and structured to automatically generate query result signals which indicate one or more future time points at which increased economic activity (e.g., more matching jobs) is expected corresponding to the economically-directed search query.

Other aspects of the disclosure will become apparent from the below detailed description.

BRIEF DESCRIPTION OF THE DRAWINGS

The below detailed description section makes reference to the accompanying drawings, in which:

FIG. 1 is a graph of time versus general business cycle and versus a specific industry cycle for explaining how each of a job seeker and job offeror may come to initially visit a job matching node at an inopportune time;

FIG. 2 is a schematic diagram of a system in accordance with the disclosure;

DETAILED DESCRIPTION

Figure 3:
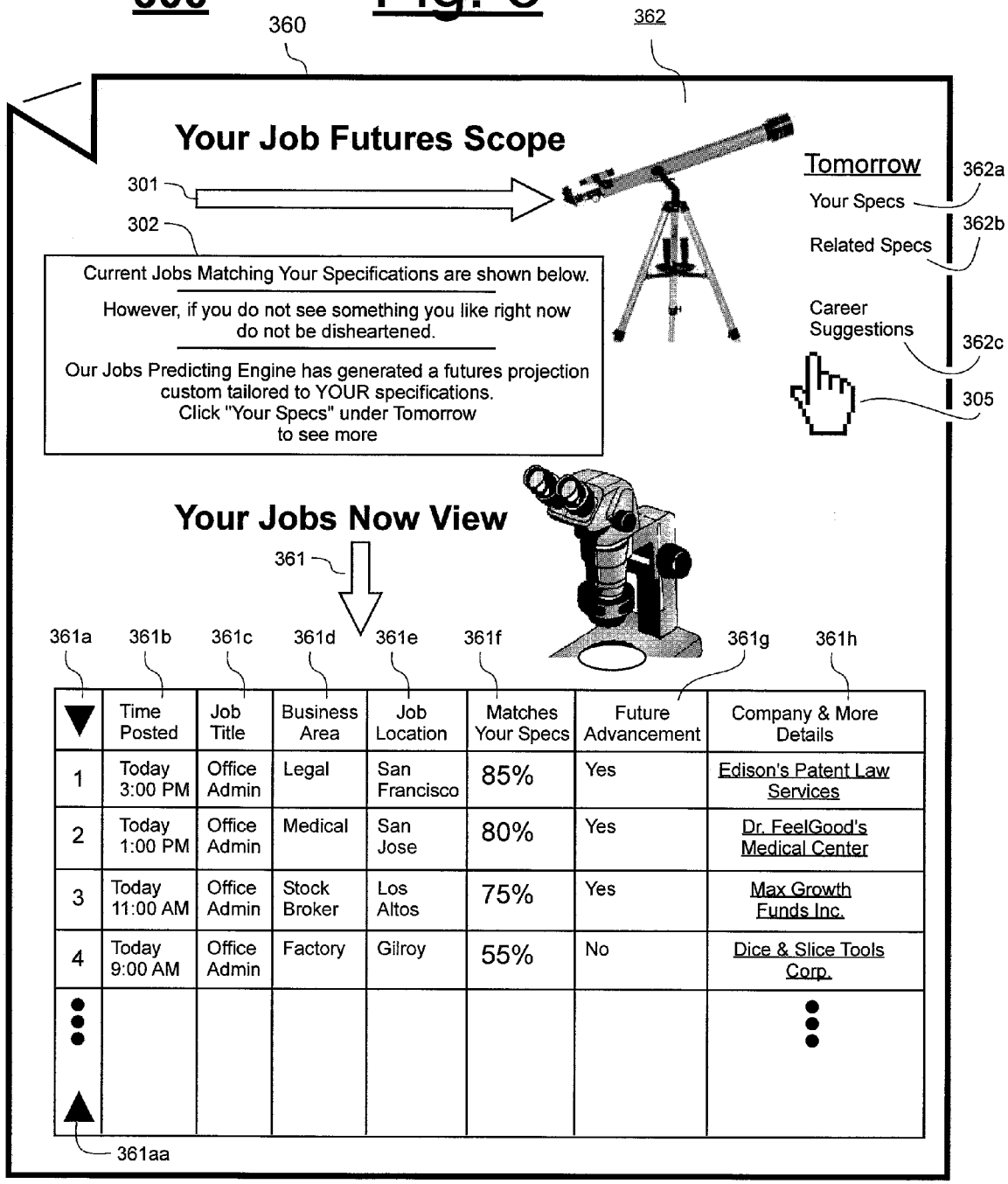
FIG. 3 is a schematic diagram of a first web page that a job seeker may be greeted with after the seeker has submitted his or her job search query to an automated search engine in a system like that of FIG. 2.

Referring to FIG. 1, it is known that the general business cycle often oscillates between fast (good) times and slow (not-so-good) times. When business is slow, more people tend to be unemployed or positioned in low paying jobs or in jobs for which they are over-qualified. When business is good, employers (job offerors) often find themselves in short supply of enough qualified help. Timings are such that more job seekers typically seek employment during the slow (not-so-good) times and more job offerors offer jobs only after the fast (good) times have become clearly apparent. In other words, job seekers generally arrive in the marketplace too soon, before recovery occurs from a downward part of the business cycle and job offerors generally arrive in the marketplace too late, after the recovery is already in full swing and many of the better job candidates have been snatched up by competitors.

More specifically, FIG. 1 provides a graph 100 including a first plot 110 of past general business activity versus time 101. The Y axis may represent any of a number of metric indicators for the health of a business cycle including the product of price times volume of demand from customers for a general basket of goods and/or services or the same for a given class of goods or services. Graph 100 also includes a second plot 120 of past business activity in a specific business sector versus time 101. The purpose of these historic plots 110, 120 and their respective extensions 112, 122 into the future (beyond time point 106) is for explaining how a job seeker may come to initially visit a given job-matching internet site at an inopportune time such as 106 (too soon before the business cycles recover from respective downward turns). Event arrow 105 represents a given seeker, S visiting the matching site (not shown) at or near low points in the general and specific business cycles, 110 and 120, where the seeker S presents him or herself to the site as having qualifications Q; as looking for a job defined by expression J in a business category defined by expression K and located in one or more job locations defined by expression L. A more specific example might be, "I'm looking for a job as an office administrator in the medical service provider business sector where the job is located in the north part of the city and here is a copy of my resume".

Incidentally, when the term "visit" is used herein, unless otherwise indicated it is understood to be a virtual or electronically mediated visit as opposed to a physical visit. The user does not physically go to the location of the given job match site (or other form of job finding node). Instead physical signals (e.g., electrical and/or photonic signals) are exchanged between a user-accessed device (e.g., 210 of FIG. 2) and one or more devices at a job find node (e.g., a job match web site) to thereby give the user a sense of being there, of virtually visiting the resources provided by the job find node. The term, "job find node" is to be understood as encompassing not only internet-accessible web pages (e.g., those that download HTML coded page descriptions) but also other similar types of computer-implemented nodes that can be navigated to (visited) and queried for informational feedback. For sake of simplicity, the below description will assume that the job find node (e.g., 250) is constituted by one or more computer servers that provide internet-accessible web page services to virtual visitors.

As seen in FIG. 1, the seeker S typically visits a given job find node at inopportune time 106 where the general and specific business cycles are at their relative low points. Such inopportune timing is not uncommon for several reasons. First, during the low points of the general or specific business cycles, 110 and 120, more people are usually unemployed and therefore seeking replacements for recently lost jobs. Additionally, more people are positioned in unsatisfactory jobs and are looking for improvement to their current situations. But it is exactly at this inopportune time 106 that the job matching site is most likely to return unsatisfactory search results in response to a given job seekers' queries (see query 215 of FIG. 2), where the latter queries define the seeker's qualifications as Q and the desired job as J as well as perhaps an industry category as K and desired location(s) for the position as L. Each individual job seeker S may not appreciate that he/she is submitting his/her query (215) at an inopportune time 106 relative to that specific set of query parameters (Q/J,K,L, etc.). Instead, the job seeker may erroneously conclude from the unsatisfactory search results returned by a job match site that is navigationally identified as URL-X (site not shown) that the visited job match site is at fault for not providing better search results that match the job seeker's need. The job seeker may erroneously conclude that the visited job match site (having the universal resource locating address of URL-X) is a poor one which does not, and will not in the future meet the seeker's needs. As a result of this unfounded negative impression (see 205 of FIG. 2), the job seeker may leave the job site for good, never to virtually revisit it again due to the erroneously created impression that this particular job site (URL-X) does not and will not produce good results for the searcher's needs.

However, this rush-to-judgment impression (205) may be wrong. The error can be injurious to the operators of the visited site (URL-X) because, but for the bad impression having been created by the premature visit (105), the job seeker would have developed a more favorable impression had he or she only visited the site at a more opportune time (e.g., 108). The erroneous impression can also be injurious to job offerors who offer jobs via the visited site (URL-X) because, but for the bad impression that was created by the premature visit (105), the job seeker may have made him or herself available at a later time (e.g., 109) just when the job offeror is offering matching jobs through that visited site (URL-X).

FIG. 1 uses dashed extension plots 112 and 122 to show how respective business cycles 110 and 120 may hypothetically evolve at future time points 107-109. It is to be understood that extension plot 122 is for a specific job J in category K and offered for location(s) L while dashed plot 112 represents a general future business climate. As seen, the exemplary J/K/L future plot 122 is a cyclical or seasonal one that offers successively improving job prospects at, for example, future time points 107, 108 and 109 while the general extension plot 112 fails to provide such detailed information. It may be useful to a given job seeker to know when to next visit a given job find node so that the seeker does not waste time visiting at inopportune times and/or so that the seeker does not become disheartened by a randomly timed visit made at an inopportune moment (e.g., 106).

It may be appreciated from extension plot 122 that even though a disappointing impression was created by a randomly timed first visit 105, if only the disappointed job seeker S were to revisit the same job match site (URL-X) at a less randomly picked time point such as 107 or better yet at time points 108 (associated with projected business surge 128) or 109 (associated with specific business surge 129), that job seeker S would more likely experience a much richer return of matching job hits in response to his/her query (215) and that the seeker will then more likely have a much better impression (205) of the ability of the job match site (URL-X) to provide results that are useful for that specific seeker. The better satisfied seeker of time points 107, 108, 109 may then relay his/her positive impressions to other seekers and they to their friends, and so on. As a result, the popularity and success of the job match site (URL-X) may grow quickly. Conversely, if the seeker of time point 106 relays his/her imprudently-formed negative impressions of the site to other seekers, the popularity and success of the job match site may unfairly suffer. Thus it is useful for all concerned that a job seeker who visits the job match site at an inopportune time such as 106 not develop an unfair negative impression of the site when in fact the site can provide much better results at a slightly later time (e.g., 107).

FIG. 1 additionally shows a future event 114 (at time point 109) where a given employer R submits one or more requests, X for a number N of matching seekers having qualifications, Q' and who are ready to accept a job described as J' in business category described as K' and in location(s) described as L'. As mentioned, the request submission event 114 tends to occur near a top of the general business cycle 112 at a point where business is much improved and therefore the employer (job offeror) R needs many qualified job seekers to fill many openings in view of business surge 129 in their specific industry. Unfortunately, the timings of the job seekers' queries 105 and of the employers' submissions 114 generally tend to miss each other. They typically arrive at opposed falling and rising phases of the general and/or specific business cycles 110 and 120. Even though the business cycle may be much improved at future time point 109, the job seeker who visited at time point 106 may not revisit the job match site because the seeker S had earlier developed an ingrained impression that this job site (URL-X) does not provide good matches due to earlier interaction 105. Consequently, the operators of the given job site and the employers R who submit requests at time point 109 are damaged because qualified job seekers do not return back to the job search site just when such qualified job seekers are more needed (e.g., time point 108).

Additionally, it is to be noted that if only job offeror R (of event 114) had submitted the one or more requests, X at a slightly early part of the business recovery cycle (before peak 129 in that offeror's specific business sector), that job offeror may have had better chances for snatching up better qualified job candidates before competitors do so. In short, it is advantageous for both job seekers (S) and job offerors (R) to be informed ahead of time of when the business cycles for their respective specialties or business sectors are expected to improve (e.g., to recover from a downturn) and for these participants to be invited to revisit the site at a more opportune time (e.g., 108).

FIG. 2 illustrates a system 200 in accordance with the disclosure that can provide a solution to the above disclosed problems. Job seekers such as 201 are given an opportunity to view (or otherwise receive) one or more trustworthy prediction reports 262 that indicate when future job volumes that match the seekers' qualifications (Q) and/or other requirements (J/K/L) are expected (projected) to increase. In other words, the job seekers (201) are supplied with feedback data 262 that provides an indication of the expected shape of future curves 112 and/or 122 of FIG. 1. The feedback data 262 may indicate to the job seeker S that he/she should not be disheartened by poor current search results (261) returned at the moment (e.g., time point 106) because better results are expected from the same search node in a near future (e.g., 107) or further out (e.g., 109) based on trustworthy business forecasting models (255, discussed below) provided within the site's subsystems 250. As a result of such future casting, the job seeker may come to realize that he/she merely visited the job-search node (e.g., website URL-X as defined by the user's browser device 210) at an inopportune time 106 and the job seeker 201 may be encouraged to revisit the same website (e.g., URL-X') or an affiliated alternate site (e.g., URL-Y') at the specified later dates for better results. Additionally, the visited node may seek permission (263) from the seeker to automatically email to that seeker, or otherwise automatically push to that seeker, an advisement at a future date indicating the more opportune time (e.g., 107) to re-use the search node. Optionally, the automatically pushed advisement will include results from an automatically run job search query identical to or similar to the one (215) the job seeker ran at an earlier date where the later job search query provides improved results (e.g., more jobs and/or higher paying ones). At minimum, the job seeker 201 is given the impression that this currently-visited job-search website (as experienced over his/her computer 210 or other connection device, i.e. a PDA) cares about the searcher's needs, cares about constraints on the seeker's personal time schedule (202), cares about giving the seeker better control over his/her personal career path (203), and is not just another impersonal website that merely connects the seeker to a cold-search database (252).

While not specifically shown in FIG. 2, it should now become apparent that when the given job match site (e.g., URL-X', where the latter universal resource locater can be an address assigned to node 250) invites a given number of alike qualified job seekers (having qualification Q') to revisit as an aggregate at a more opportune time such as 108 of FIG. 1 (for projected surge 128 in business curve 122), the same job match site can pre-warn job offerors such as R of FIG. 1 that a certain portion of such revisiting and aggregated job seekers (having qualification Q') are expected to revisit at the given time point (e.g., 108 of FIG. 1) and that it may be in the job offeror's interest to submit matching requests X before the given time point (e.g., just before 108 of FIG. 1) so as to thereby reap the rewards of the expected surge of revisiting job seekers at the given time point (e.g., 108 of FIG. 1). Moreover, the given job match site (e.g., URL-X') can pre-warn job offerors such as R of FIG. 1 that the site is predicting an even bigger surge (e.g., 129) in business needs for business sector curve 122 at a later time point (e.g., 109 of FIG. 1) and that it would be in the job offeror's interests to try and snatch up the better qualified candidates in preceding surge 108 of projected business curve 122 by submitting their requests X to the site (e.g., URL-X') before time point 108. Thus when the job seekers return at time point 108, the job offerings are more likely to be there (in database(s) 252) to match the job seekers' desires because the site server(s) 250 proactively coordinated the revisit timings of the qualified job seekers (S) and the corresponding job offerors (R) operating in business sector 122.

In one embodiment, respective job seekers and/or job offerors are required to fill out subscription forms and/or take other subscribing actions before being allowed to view more than a default amount of future projection data (e.g., 262) generated by the future-casting web site (e.g., URL-X'). In the case of job seekers, the other subscribing actions may include submission of a current resume. In the case of job offerors, the other subscribing actions may include submission of detailed information about offeror's company.

In terms of more detailed specifics, one embodiment of system 200 (FIG. 2) includes one or more computer servers/subsystems within logical node 250 (servers not individually shown) having appropriate hardware (e.g., CPU, memory, etc.) and appropriate software (e.g., executable instruction signals and/or supporting data) for providing the indicated functions. The indicated functions include that of providing a job seekers' query interface 251, providing a first relational database 252 (centralized or distributed as a cloud) for storing current job postings and searching through them, providing a second relational database 254 (centralized or distributed as a cloud) for storing previous job postings (as submitted to the node 250 by subscribed or otherwise credentialed job offerors 241) plus other historic data and correlating those with historic economic indicators (285'), and providing one or more futures predicting engines 255 (only one shown) which use the historic database 254 as well as currently supplied economic predictor factors 285 and respective prediction algorithms to predict future job growth or shrinkage in various business areas by use of regression curve fitting and/or other modeling techniques. When more than one prediction algorithm is used and different predicting engines 255 (only one shown) generate substantially different prediction results, the predicting engine that shows the closest to reality results for near term historical data as input versus current market conditions as output, is chosen.

Although not explicitly shown, it is to be understood that the servers/subsystems of logical node 250 may be distributed as a cloud across a network rather than being centrally located. Hence the term, "logical node" is used here. More specifically, the current job postings database 252 may include job posting servers located at and/or controlled by subscribing employers so that their respective job postings are immediately in real time added to the domain of current job postings rather than waiting for node operator to process job postings submitted by nonsubscribed employers. Subscribing employers may be required to contractually agree to predefined quality and accessibility requirements when adding their locally controlled servers to the postings database cloud.252.

Although not explicitly shown, it is to be further understood that the centralized and/or cloud-wise distributed servers/subsystems of logical node 250 may further provide a job offerors' interface function (subsumed in network connection symbol 240) that enables job offerors (e.g., those not subscribed to the cloud posting system) to remotely upload job postings into postings database 252 and enables the job offerors (e.g., subscribed ones) to remotely download requested futures projections 246 that indicate when business surges (e.g., 129) are expected and when surges (e.g., 108) in revisiting qualified job seekers (S) are expected.

In order to generate some of the predictions, a first report generator 257 is provided and coupled to the current jobs database(s) 252 and to the futures predicting engine(s) 255 for thereby producing a combined now-and-later report 260 for job seekers in response to a supplied seeker's query 215. As seen, the generated report 260 may include a first section 261 that lists currently matching jobs for the currently supplied query 215 and a second section 262 that lists expected future matching jobs (at least the number of such jobs) and the expected times for such jobs (and/or their volumes) appearing. An optional third section 263 requests permission from the job seeker (201) to proactively contact that seeker at later times (e.g., 108) with reports of more promising job opportunities via email or other push-type messaging means (fax, phone call, text messaging, instant messaging, etc.). The pushed report may include results of a rerun of that seeker's earlier supplied query 215 but run at the later, more opportune time. It is to be understood that a job seeker's first visit or later revisit (220) to the given job match website is a pull-type operation because it is the job seeker (or more accurately his browser device 210) who/which is authorizing upload of the seeker's query 215 and requesting a corresponding download (265) of corresponding result data 260 from the website. Thus, such pull-type visitations often rely on developed goodwill (205) of the job seeker community where the developed goodwill motivates individual seekers (e.g., 201) to visit the particular job match site. Push-type messaging tends to be more intrusive and can destroy goodwill if the seeker had not a priori given his/her permission to receive the push-type invitation messages (e.g., Email: "Come visit our website today. We have many new jobs for you. Click here.")

Referring to the seeker's interface device (e.g., browser device, access device) 210, it is to be understood that physical signaling interactions over public or private network 220 and between seeker's device 210 and node 250 enable the seeker 201 to fill out or otherwise generate a query-defining data set 215 that is submitted directly or indirectly to databases 252 and 254 within node 250. Similarly, it is physical signaling interactions over public or private network 220 that enable the user to ultimately receive the corresponding futures report 262 that lists expected future matching jobs or at least expected numbers thereof) via device 210 or through other electronic interface means. As such, a system is disclosed here that enables a user 201 to submit a job seeking query 215 via a first interface device 210 and enables the user to receive a corresponding future jobs prediction 262 via the same first interface device 210 or via another such interface device (e.g., another computer, a facsimile machine, a PDA or third generation cell phone, a digital set-top box connected to a television monitor and connected to receive digitized video over cable or otherwise, etc.). While FIG. 2 shows the user interface device 210 to possibly be a laptop computer or a PDA and connection 220 to be a bidirectional one, the present disclosure is not limited to such. The user interface device 210 could include a plurality of different devices by way of which the user specifies a query 215 and receives corresponding results 260 including possibly the futures projections 262 or pushed alerts/advisements 263. For example a seeker may place a telephone call into an automated telephone call processing portion of interface 251 using a cellular telephone (e.g., an Apple iPod™ phone or another such third generation telephoning device) and vocally specify his query 215 as well as specifying a receiving device that is to receive the corresponding results 260 as well as the format of the returned results 260. More specifically, if the user interface device 210 includes a third generation telephoning device capable of displaying high resolution graphics, the seeker may indicate that he wants the search results sent as graphics back to the same telephoning device. Alternatively, the seeker may vocally request that the results 260 be emailed as graphics to a prespecified email address or sent via a scheduled cable television digital broadcast or streaming internet broadcast over a specified communication channel to a specified set-top box (e.g., one with video image and/or digital data recording capabilities). Pushed alerts/advisements 263 may include automatically sent voicemails to the seeker's pre-specified telephone device and indicating to him something such as, "We just sent you exciting job search results; check your email". Pushed alerts/advisements 263 may include automatically sent television or other video content (over internet digitized video) that is custom sent to a user's set-top box. By way of example, a first short advisement may automatically appear on the user's television screen, after having been captured by the user's set-top box as a voice and graphics advertisement saying something like, "Use your remote control to switch to channel A995 to learn more about exciting new job prospects in your area". The user may then elect to watch the corresponding advertisement or not based on mood. If yes, the private channel A995 (for example, which could be prerecorded digital content) may display a list of jobs matching a recent search run and reported by the job match node where the displayed list instructs the user to use his remote control switch to other private channels for more details about the respective jobs. In this way, a busy seeker with a deeply stacked email account can be alerted, even when relaxing at home in front of the television set (as driven by the set-top box), to look for the consented-to pushed information concerning improved job search results. In one variation, the seeker consents to roughly once a week or roughly once a month pushed advisements (via email, private television advertisements, etc.) where the underlying searches of the roughly periodic advisements are timed to provide the seeker with optimal results based on the seeker's most recent query inputs 215.

One embodiment includes a feature called the "What is here now and in the future" function. This applies to situations where the seeker's access device 210 is a mobile one with built in location awareness. By way of example, the seeker's access device 210 can be a cellular telephone with built in GPS capability (Global Positioning Satellite capability) and/or other means for determining the device's current location. It could be a built in automobile console in the user's car having a location determining means (e.g., GPS) and voice based interactivity so a driver can operate it in hands free mode. In any of such cases, the location aware access device 210 provides a user activatable option that functions as the "What is here now and in the future" function. When activated, the function temporarily modifies the seeker's last outstanding query 215 by automatically replacing the user entered, location field with the current location ("Here") as sensed by the mobile device's location awareness unit (e.g., built-in or BlueTooth™ connected GPS unit). It then automatically displays the job search results (261) for the location defined as "Here" by the location awareness unit of the seeker's access device 210. Then at the user's request or automatically so, it next displays or otherwise reports (e.g., via automobile voice interactive console) the projected results (262) for a future time point based on the automatically defined "Here" as being the user's center of radial search.

An exemplary use of the "What is here now and in the future" function is as follows. The user is contemplating moving to a new home or apartment in a neighborhood the user is not totally familiar with. One of the factors the user wants to consider before committing to the move is: How many matching jobs are there for me now and centered on this new location (Here) and how many can I expect to have 6 months, one year, or even further out into the future? So the user drives around in his car about the contemplated new neighborhood and activates the "What is here now and in the future" function on his car console. In response, the system automatically reports every so often on the density of matching jobs now and in the future for the location that is automatically denoted as "Here" by the activated function. In one embodiment, the rate of refresh is determined by change of distance from the "Here" location of the last similar report. In one embodiment, the rate of refresh is alternatively or additionally determined by change of search results based on change of what would be defined as "Here" by a refresh of the "What is here now and in the future" function. To do so, the system periodically pulls the "Here" location from the location determining means (e.g., GPS) of the seeker's access device 210 and generates hidden results that are not immediately reported to the seeker. If the hidden results show a substantial change over the last nonhidden report, the system automatically reports those new, substantially different search results to the user as updated results for the "What is here now and in the future" function. Thus as the seeker drives around or otherwise explores a new neighborhood, he becomes instantly aware of changes in job availability densities in the new "Here" location (and also instantly aware of changes in predicted job densities for the future). While one example of the "What is here now and in the future" function is depicted for a driver using his automobile console, it is within the contemplation of the disclosure for the "What is here now and in the future" function to be used by a pedestrian for example who is walking about a business area or residential area of an unfamiliar neighbor hood with his cellular phone activated to repeatedly carry out the "What is here now and in the future" function. Or it could be a user who riding a bus, a taxi and at the same time exploring current and future job prospects in the area either for himself or for a friend. In other words, the "What is here now and in the future" function opens up new ways of looking at new locations. The user is not limited to just what his eyes can see in the now but also to what his access device 210 can report as being the matching job prospects for an appropriate radius of inquiry now and in the future. In one embodiment, the appropriate radius of inquiry is automatically determined based on the system periodically sampling the "Here" data and determining the rate of speed at which the user is traveling. If travel appears to be by foot, the radius may be set to be relatively smaller. On the other hand, if travel appears to be on a high speed highway, the radius of relevant results may be automatically set to be substantially larger.

Returning to the more general case of FIG. 2, the illustrated node 250 also includes a third relational database 270 (centralized or distributed as a cloud) that stores recently submitted resumes by responding seekers who agree to provide such resumes. Generally, job seekers (201) do not like to leave copies of their personal resumes behind at untrusted or untested job-search sites (or other such nodes) for which they have not yet developed a sense of goodwill. The job seekers prefer to first find a website that demonstrates an ability to provide satisfactory and trusted results. Build-up of trust and confidence takes time. Job seekers generally want to find a job match website that meets the seeker's personal goals and requirements rather than merely meeting a given employer's requirements. The illustrated logical node 250 can first demonstrate that it meets the seeker's requirements before asking the seeker to provide a resume. Node 250 can give each seeker 201 a sense of more control over his or her personal career path (203) by providing semi-personalized prediction services (e.g., by revealing parts of business sector specific prediction curve 122 of FIG. 1) for each uniquely supplied query 215. Thus, the seeker 201 can come to feel that this job-match site (as experienced over his/her computer 210 or other interface device, i.e. a PDA, iPhone™, etc.) custom tailors its responses to the unique needs of the seeker. As a result, seekers are more prone to voluntarily revisit and ultimately submit (275) their resumes into database 270. The website operator may then advertise to prospective employers (241) that the website has a large repository of already on-file and current resumes (270) that match the needs of those specific employers. As a result, more employers are likely to use the site for their postings (245, real time or delayed) of job offerings because the site has demonstrated over time that it has an inventory (270) of good current resumes from qualified job candidates (201). Virally spread word of mouth about this situation in turn tends to draw yet more job seekers to the site as they come to learn that the site has a growing number of high quality job offerors posting (245) to the site. In one embodiment, job seekers must subscribe (and get a password via email or otherwise) in order to be granted free viewings of a first predetermined number N1 (e.g., 5) of futures reports 262 over a predetermined length L1 of time (e.g., 2 months) and thereafter, the subscribed job seekers must provide a current resume (e.g., most recent of last 2 months) with permission for the job site to hold it in database 270 in order for the subscribed job seekers to gain free viewings access to a second number N2 (e.g., 25) of futures reports 262 over a next predetermined length L2 of time (e.g., 6 months). In this way, the job seekers are encouraged to initially submit their resumes and to provide more recently updated resumes every so often.

In one embodiment, the subsystem query interface 251 communicates with a seeker's designated interface device 210 (e.g., a desktop computer, a laptop, a personal digital assistant, 3rd Generation phone, etc.) by way of a public or private network 220 such as the internet and/or cellular telephone facilities. The query interface 251 may download a blank or partially prefilled fill-in form for generating or specifying the query data 215 that will be submitted directly or indirectly and on behalf of the job seeker 201 into first database 252. The query 215 is also submitted via path 253 into second database 254. The second database 254 uses connection 253 to accumulate a historical record of submitted queries from multiple seekers where the latter accumulations and their trends may be used to predict surges in visitation by specific categories of job seekers.

Acceptable input parameters within the seeker-submitted query 215 may include one or more of the following: (1) occupational title (e.g. J=administrator, manager, computer programmer, etc.); (2) industry of interest (e.g., K=finance, medical, legal, etc.); (3) desired geography (e.g., L=country, province, state (or more detailed location information)); (4) seeker's education level (e.g. E=high school, bachelors degree, PhD, etc.); (5) seeker's desired salary level; (6) seeker's experience level (e.g., Q=number of years in the field, diversity of experience in the same or related fields, etc.) and other query filtering parameters. In one embodiment, the other query parameters include filtering keywords that limit the search results to employers that qualify for example as: (7) being start-ups, (8) being involved in the digital media business, (9) being generally deemed to be "cool" or "fun" by their employees, (10) employers that are in a high growth sector, (11) employers that have been recently funded by venture capitalists, (12) employers that offer generous benefits such as long holidays, good medical insurance coverage, etc. The filtering keywords may also specify specific job specialties or skills such as level 3 neonatal nursing or mortgage refinance expert, etc.

In one embodiment the futures predictor 255 custom tailors its output to a given seeker's input set of query parameters 215 as relayed to the futures predictor 255 via connection 253. Accordingly, the future predictions (e.g., 262) output by predictor 255 in response to search results produced by historical database 254 can be highly customized to the personal needs and desires (202, 203) of a given job seeker (e.g., curve 122) rather than constituting mere general predictions for general industries (e.g., curve 112). In order to provide such detailed and highly specific predictions, the futures predictor 255 relies on an extensive historic database 254 that is built up over time from job postings (245) submitted by employers 241 for specific jobs (J) in specific categories (K) and specific locations (L) and from queries (215) submitted by multitudes of job seekers and from other prediction assisting data (283, 285') accumulated over time and time stamped so as to allow for development of chronological-tends associations between the time-stamped pieces of collected data. Of course the system cannot predict accurately any future trends for specialty jobs that have no historical background information in the historic database 254. In one embodiment, the historic database 254 periodically pulls in additional economically-directed history information 283 automatically from external sources via an internet connection 280 or other network connections so as to supplement the locally-generated history data obtained from database 252 and connection 253. Among the additional history information pulled in by historic database 254 are historic leading indicators 285' which are time-stamped to thereby establish correlations to contemporaneously or later pulled-in historic economic data 283. Thus, correlations if any, can be detected and recorded as existing between various leading indicators 285' and associated contemporaneous or later-dated other historic economic data 283. The built up correlations ultimately connect logically to historic data 283 about numbers of jobs in each of enumerated job categories and specialties. The economically-directed history information 283 gathered by the historic database 254 may include trend data regarding supply and/or demand growth or decline in various pre-categorized industry sectors. For example, some seasonal industries maintain records of book to bill ratios that indicate how many new orders come in for a given month relative to same month last year for respective goods or services. The historic database 254 may automatically gather such book to bill ratio data for various pre-categorized industry sectors. For example, essentially all publicly traded companies and some privately-held companies publish profit and loss statements (including revenues and costs) which may show quarterly trends of growth or decline. The historic database 254 may automatically gather such profit and loss statements.

The futures predictor 255 pulls in current economic prediction factors 285 (e.g., leading indicators data) via internet connection 280 or from other network systems in order to generate its prediction numbers or curves (e.g., curves 112, 122). Prediction curves may be generated by regression curve fitting and/or other modeling techniques (e.g., Kalman filters) which seek to develop prediction rules for how job numbers relate to various current leading indicators 285 based on the performance of previous leading indicators 285'. The pulled-in current economic predictor factors 285 may include general economic indicators such as industry growth rates, key economic indicators, inflation indicators, current interest rates and so forth. More specifically, statistical employment data may be downloaded from the U.S. Bureau of Labor Statistics and Occupational Employment Projections website {at: http://www.bls.gov/enp/}. Downloaded general economic leading indicators may include Gross Domestic Product numbers (GDP) obtained from the U.S. Bureau of Economic Analysis (BEA) for example {at http://www.bea.doc.gov/bea/rels.htm}. The current consumer price index (CPI) may be downloaded from the U.S. Bureau of Labor Statistics for example by way of {http://stats.bls.gov/news.release/cpi.nr0.htm}. Additionally the producer price index (PPI) may be obtained from the U.S. Bureau of Labor Statistics at for example {http://stats.bls.gov/news.release/ppi.nr0.htm}. Payroll employment may be further obtained from the U.S. Bureau of Labor Statistics at {http://stats.bls-.gov/news.release/empsit.nr0.htm}. Unemployment rate statistics may be downloaded from the U.S. Bureau of Labor Statistics at for example {http://stats.bls-.gov/news.release/empsit/nr0.htm}. The latest consumer credit statistics may be obtained from the U.S. Federal Reserve Board for example at {http://www.federalreserve.gov/releases/G19/}. Furthermore the latest statistics in housing starts may be obtained from the U.S. Census Bureau for example at {http://www.census.gov/starts}. Moreover statistics for initial jobless claims may be obtained from the U.S. Census Bureau at for example {http://www.dol-.gov/opa/media/press/eta/ui/current.htm}. The current Federal Funds Rate may be further obtained from the Federal Reserve Board for example {http://www.federalreserve.gov/fomc/fundsrate.htm}. Further leading economic indicators may be obtained from the Stock Market including for example the current Dow Jones industrial number, the Standard and Poor's 500 Index and so forth.

One or more of the above current economic predictor factors 285 may be correlated or otherwise combined with statistics obtained from the historic database 254 where those statistics are for jobs that match the current query 215 and have been added to the database for example, over the last week, over the last 30 days, over the last 90 days, over the last year, over the past 2-5 years, etc. In one embodiment, the jobs listed in the historic database 254 are categorized at least in accordance with ONET categories as defined by the U.S. Bureau of Labor Statistics and Occupational Employment Projections.

The additional historic information 283 that is downloaded over the internet 280 may include industry specific information indicating the seasonality or cyclicality of specific industries and how those cycles and their magnitudes may correlate with general business cycle information. Futures predictor 255 may use the cyclicality information to better model expected future cycles in a specific business category (e.g., that of curve 122). For example, in FIG. 1, it is seen that predicted future plot 122 for business sector K/L is both cyclical and represents a growing sine wave of sorts that is tied to growth in the general predicted business cycle 112. By correctly estimating where the demand peaks will be (e.g., 128, 129), the job match site can demonstrate its trustworthiness to users (e.g., 201, 241) and thereby generate goodwill. Additional industry specific information that is pulled in (283, 285') may include industry growth rates for specific industries. The pulled-in information (283, 285') may further include company specific information with regard to companies whose jobs are listed in the current or historic databases 252 and 254. This information may include the size of the company, company news regarding layoffs, press releases, reports of new funding, etc. and finance analyst projections for each of the companies.

In doing all this, the job site is not predicting the futures of all things but rather the futures (e.g., numbers of jobs) that are of prime interest to the job seekers (201) who have already visited the site and submitted their queries (215) and have thereby expressed their areas of interest. So the system 250 is adapting itself in real time to the expressed needs of its users 201, 241 rather than trying to be all things to all people. Of course futures predictions (e.g., curve 122) should not be extended so far into the future as to risk being completely wrong and thereby creating bad will among users. In one embodiment, the system 250 automatically keeps a score card of how close its predictions have been relative to actual outcomes over, say, the last 6 months and presents such score card information to users (e.g., 201, 241) as part of self-validating operations. The predictions score card (not shown) may be embedded in the returned query results 260 produced by reports generator 257.

In one embodiment, each time a predictive query result 262 is transmitted (265) to an inquiring job seeker, a count is kept in a results accumulating means 266 of how many job seekers with respective qualifications Q/J/K/L/etc. have been advised to revisit at respective time points like 107, 108, 109, etc. The predictor engine develops a self-validating model of what proportion of the so-advised job seekers in the given class (e.g., Q/J/K/L/etc.) are expected to return in each of the recommended revisit time points like 107, 108, 109, etc. This prediction is fed through the reports generator 257 to produce a revisit surge report 246. The revisit surge report 246 is then transmitted (247) to qualification matched job offerors (241) who ask for such a report and it informs them of when it might be best for them to post new job offers for categories like Q/J/K/L/etc. so that the job offerors do not post too late (e.g., at the peak of surge 129 rather than before it) and thereby lose out to competitors who snatch up better qualified job candidates at earlier points along the business recovery portions of the respective business activities curves (e.g., 122).

Referring to FIG. 3, an example 300 is given of what a first query results screen shot 360 might look like on screen 211 of FIG. 2 for a job seeker (e.g., 201) who has submitted a query (215) seeking a position as an "Office Administrator" with the location being limited to Northern California for example. The bottom half, 361 of screen shot 360 may provide results for currently available and matching jobs. (Section 361 of FIG. 3 corresponds to section 261 of FIG. 2.) As seen in the example, the lower screen shot section 361 points the user to a view entitled for example, "Your Jobs Now View". In one embodiment, a column-wise sortable database table 361*a*/361*h* is presented having respective columns 361*a*-361*h*. Pressing (e.g., mouse clicking on) on the down arrow at the top of the row-numbering first column 361*a* may cause the display to refresh and show the next sequence of numbered job postings, if any. Pressing on the up arrow 361*aa* at the bottom of row numbering column 361*a* may cause the display to refresh and show the previous sequence of numbered job postings, if any.

Pressing the header cell of next column 361*b* may cause the results table to refresh and show posts in older-first order rather than the illustrated newest on-top order. In this particular example, next column 361*c* shows the job title as always being "Office Admin" because the user limited his/her search to just that one job description (J). Had the job description expression (J) been broader (e.g., Office Admin OR Office Staff), column 361*c* may have shown different job descriptions in respective ones of the rows. Pressing on the header cell of column 361*c* in the latter case may reorder the job descriptions in alphabetic ascending or alphabetic descending order.

Next column 361*d* shows the business area or category. In this case the seeker may have left the query search open to accepting "any". However, the seeker may have a preference for example to working in the finance area (e.g., stock broker) as opposed to working in a factory or vise versa. Next column 361*e* shows the job location. Pressing on the header cell of column 361*e* may reorder the rows with location appearing in alphabetic ascending or descending order or according to zip codes for example.

Next column 361*f* shows how close the given row results are to the user's query (215) requirements. Another column 361*g* may show if the job offers advancement opportunities. Yet another column 361*h* may provide hypertext linkage to more details about the job and/or about the job offeror. Screen section 361 is just a nonlimiting example and of course many variations are possible.

Referring next to the upper half 362 of FIG. 3, this part indirectly corresponds to section 262 of FIG. 2. As seen, the user is invited (301) to peer into a hyper-linkage referred to as a Job Futures Scope and to see what possibilities may lay ahead in the near future. Box 302 explains to the user that his or her current list matching jobs are shown below (in section 361). Box 302 goes on to explain that if the user does not see something they like right now, they should not be disheartened. It goes on to explain that the website's jobs predicting engine has generated a futures projection custom tailored to the user's specification. The user need merely click on the "Your Specs" hyper-linkage under the "Tomorrow" heading in order to see more (e.g., to see FIG. 4).

Under the "Tomorrow" heading in 362 there are three hyper-linkages that may be activated by use of the mouse-actuated, roaming hand symbol 305. First, if the user brings hand symbol 305 over the "Your Specs" line 362a and left clicks, the user will be navigated to a next page 460 (FIG. 4) which provides a prediction of jobs expected in the near future. If the user instead brings the hand symbol 305 and clicks on "Related Specs" 362b, the user will be navigated to another futures predicting web page 560 (FIG. 5) which shows related jobs not exactly matching those that the user had requested but which may still be of interest to the user. If the user clicks on the Career Suggestions line 362c the user will be navigated to yet a further web page (not shown) which provides yet further suggestions on how the user may alter his or her qualifications through schooling or otherwise so as to better meet the projected job market demands of tomorrow. Although the illustrated embodiment (FIG. 3) calls for a user click (305) on the "Your Specs" icon 362a, it is alternatively within the contemplation of the disclosure that some or all of the future cast information (e.g., that of FIG. 4) is immediately presented to the user on the initial results page 360. For example, a simple insert box (not shown) in a corner of page 360 may say, "Come back here tomorrow after 12:00 noon. 20 jobs matching your needs are expected."

Figure 4:
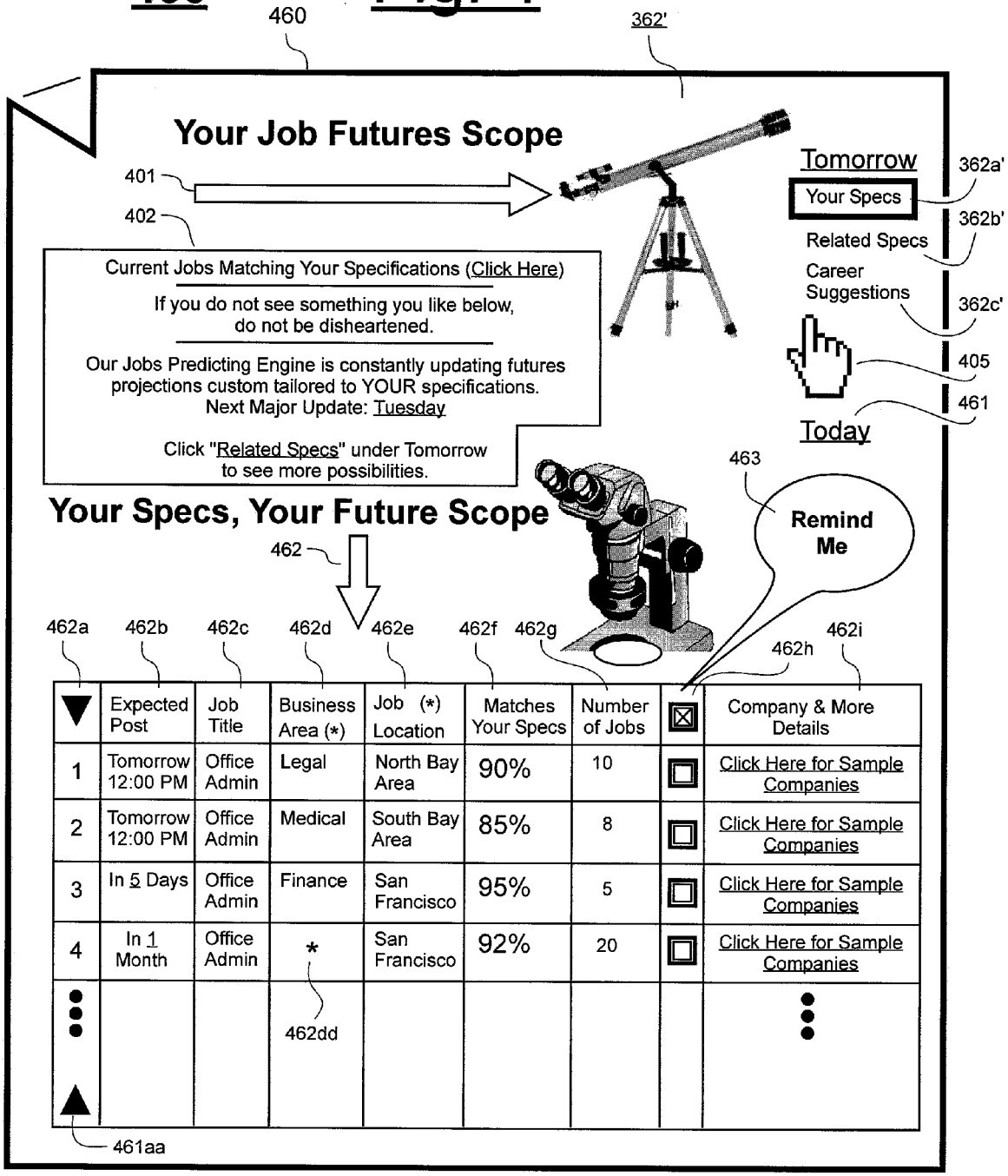
FIG. 4 is a schematic diagram of a second web page that a job seeker may be greeted with after the seeker has elected to view future job prospects.

Referring to FIG. 4, shown is a next screen shot 460 that may appear on the user's browser screen (211) after having clicked on the "Your Specs" linkage 362a of FIG. 3. In FIG. 4 the "Your Specs" linkage is highlighted (e.g., boxed) as shown at 362a' to indicate that this is the selected option. The user may still move cursor icon 405 to the Related Specs hyperlink 362b' or to the Career Suggestions hyperlink 362c' in order to navigate to those respective pages. Additionally, the user may move the selection icon 405 to the "Today" hyperlink 461 in order to link back to the web page screen shot 360 shown in FIG. 3.

Explanation box 402 redundantly explains to the user that current jobs matching his or her specifications may be found by clicking on the hyperlink denoted as "Click Here". Box 402 further indicates that if the user does not see something they like in the below Future Scope, they should not be disheartened. This being so because the site's jobs predicting engine is constantly updating futures projections custom tailored to the user's specification. Box 402 indicates that the next major update will be at the stated time (e.g., "Tuesday"). Explanatory box 402 further recommends that the user click on the "Related Specs" hyperlink under the Tomorrow heading to see more possibilities.

The website 400 and it's correspondingly displayed screen shot 460 furthermore invite (via down arrow 462) the user to look at the generated database tables for expected future jobs that are projected to match the user's specifications in the near future (e.g., time point 107 or 108 of FIG. 1). The down and up arrows in the row numbering column 462a allow the user to skip up and down in numeric ranges when large numbers of rows are provided. The "Expected Post" column 462b indicates to the user when the expected future jobs should be posted on the site's Today page (300). For example, the jobs in row 1 that have the job title of "Office Admin" and are in the business area denoted as "Legal" and in the job location denoted as "North Bay Area" are expected to appear the next day at 12 p.m. noon. The number of jobs expected to post at that time according to row 1 are ten as indicated in column 462g. Column 462h allows the user to request a push-type reminder via email or other such reminder mechanisms. After selectively checking boxes down column 462h, the user clicks the "Remind Me" button 463 and a pop up dialog box collects email contact information and/or additional data for formulating a reminder message that is to be delivered to the user at a user-selected time. Column 462i allows the user to navigate to a more detailed page that provides samplings of possible companies that are expected to provide the projected job offers.

A user who did not find any satisfactory job postings in the "Today" web page 300 of FIG. 3 may be encouraged by the results of Row 1 of FIG. 4 to revisit the same site at the projected "Tomorrow 12 p.m." time because Row 1 predicts that 10 more matching jobs (column 462g) are expected to appear at that time with a match level of 90% (column 462f) relative to the user's query specifications (215). On the other hand, if the user does not like what he/she sees in Rows 1 and 2 but rather likes the job opportunity in the finance sector as shown in Row 3, the user may be encouraged by the Row 3 results to revisit the site in five days in hope of seeing the five projected jobs in his/her preferred location of San Francisco (column 462e) and preferred industry category (finance in column 462d). Row 4 illustrates a don't care option (*). In one embodiment, the user may include don't care indicators (such as an asterisk "*" for example) for one or more query parameters (in query 215) and the responding node will then understand to not differentiate results for that input parameter when providing a feedback report (361 or 462). Additionally, when far into the future projections are made such as the 1 month projection of exemplary Row 4, the report generating engine (257) may be programmed to automatically collapse together the results for one or more of the keywords (e.g., for Business Area in the case of FIG. 4, Row 4) in such long range, future casting situations. Accordingly, FIG. 4 shows an asterisk symbol "*" 462dd in column 462d of the Row 4 results. Moreover, in one embodiment, the user may him or herself click on a header row asterisk ("*") and thereby toggle between using that column item as a differentiator or not. If the user chooses not, all the entries in that column become asterisks ("*") and rows that are otherwise undifferentiated merge into one. Accordingly, a user can collect general results for specific time slots without concern for what the business area and/or job location might be. A user can collect general results for specific job locations without concern for what the business area might be, and so on.

Additionally, column 462h provides "Remind Me" check boxes which the user may check off for thereby receiving push-type reminders of job opportunities in the selected rows. In one embodiment, when the user activates the Remind Me button 463, the system checks to see if that user has a pre-established Remind Me account With a reminder email address already entered. If not, a pop up box automatically appears on the user's browser view asking the user to provide an email address or other type of contact information so that the information can be pushed to that user. If yes, the Remind Me action takes place without further input from the user. The system remembers the user's name and contact information and allows the user to sign back in under that account when making future visits to the same website.

Figure 5:
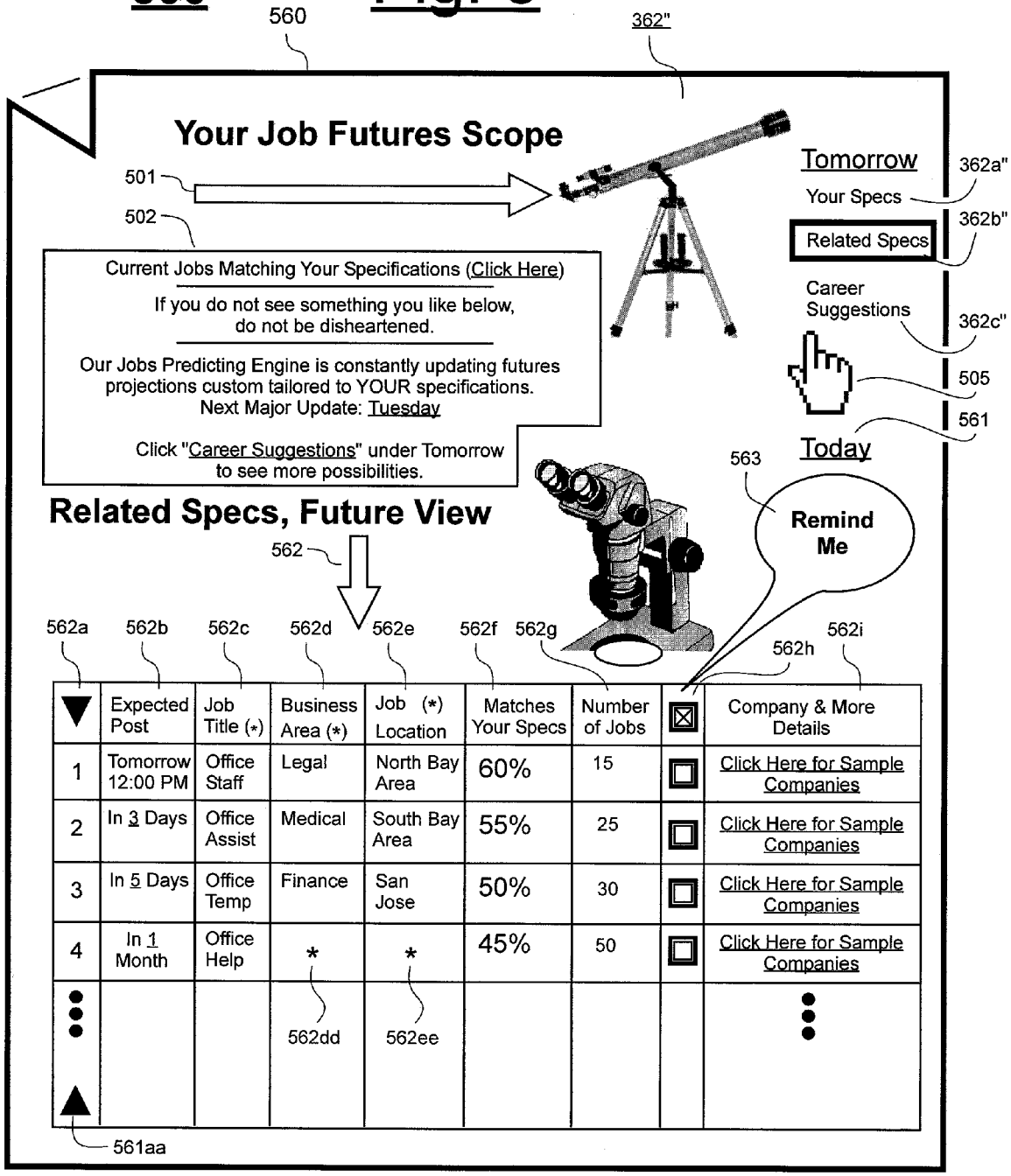
FIG. 5 is a schematic diagram of a third web page that a job seeker may be greeted with after the seeker has elected to view future job prospects in areas related to the initial area(s) sought by the seeker.

Referring to FIG. 5, like reference numbers in the 500 century series are provided corresponding to those in the 400 series of FIG. 4. As such, some redundant details will not be repeated here. In the screen shot 560 of FIG. 5, the user has selected the Related Specs option 362b" and has therefore been navigated to a Related Specs view 562 as shown in the lower half of FIG. 5. Under the Related Specs view 562, the job title column 562c does not exactly match that which the user requested. For example, if the user requested "Office Administrator" as in FIG. 4, the system automatically finds alternate job descriptions (J"≠J) that appear to be related to, but are not exactly the same as the job seeker's requested job description (J). For example, the alternate and deemed to related job description (J") is "Office Staff member" as shown in row 1 of FIG. 5, or "Office Assistant" as in row 2, "Office Temporary Help" as in row 3, and so on. It is to be noted that the matching statistics of column 562f are generally not as high as those in FIG. 4. On the other hand, the number of jobs projected to be offered in column 562g may be substantially higher and the user may be interested in these alternately described job titles (J") even though these related jobs do not fully match the user's specification as well as did the projections provided in FIG. 4.

A job seeker who does not find satisfactory results under the "Your Specs" option 362a" or under the "Related Specs" option 362b" may seek additional help under the "Career Suggestions" option 362c". As was the case with the first two options, 362a" and 362b", the predictions engine 255 (FIG. 2) may be used to provide custom tailored predictions of best career paths for a given job seeker in view of current projections in various related and closely interrelated business areas based on the current qualifications (Q) of the seeker. By way of example, the subsystem 250 may post a suggestion to the user's screen 211 stating something like: "We notice you have a Bachelor's Degree in Finance. Our predictions engine forecasts high demand next 3 years in the financial analysis sector. However, to get such a position you will need to upgrade your education to that of an MBA (Masters in Business Administration). To learn more, Click Here." Alternatively or additionally, the subsystem 250 may post a database table like that of FIG. 5 with multiple carrier choice rows displayed and a "Click Here" hyperlink in each row for taking the user to a more detailed informational page.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of a first example of a further modification in accordance with the disclosure, *action/UNIT_____ can be modified so it does *X* instead of *Y* (THIS IS A TICKLER FOR THE INVENTOR(S) TO SEE IF THEY HAVE ANY MORE IDEAS TO THROW IN AT THE LAST MINUTE)

By way of a further example, it is understood that the configuring of one or more computers in node 250 or user browser devices 210 to perform automated actions in accordance with the present disclosure can include use of a software downloading computer (not shown) that downloads appropriate machine instructing signals by way of internet and/or other transmission media to the instructable machines (e.g., 210) that are to carry out the corresponding actions including that of enabling a user (201) to submit a job seeking query (215) via a first interface device (210) and enabling the user to receive a corresponding future jobs prediction (262) via the same first interface device or via another such interface device. Accordingly, it is within the contemplation of the present disclosure to provide a computer-readable medium (e.g., a disc) or another form of software conveying product or machine-instructing means for in-loading or downloading manufactured instructing signals so as to enable a corresponding instructable machine (e.g., 210) to automatically carry out activities such as described herein. As such, it is within the scope of the disclosure to have one or more of various instructable machines (e.g., servers, laptop computers, PDA's, etc.) carry out, and/to provide a software product adapted for causing such instructable machines to carry out a machine-implemented method in accordance with the present disclosure.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein. Descriptions above regarding related technologies are not admissions that the technologies or possible relations between them were appreciated by artisans of ordinary skill in the areas of endeavor to which the present disclosure most closely pertains.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A machine-implemented method for encouraging an economic-opportunity seeker to revisit a queriable database node, the method comprising:
(a) automatically submitting the seeker's search query to an economically-directed history database for thereby selectively retrieving economically-directed historic information corresponding to the seeker's search query;
(b) automatically forwarding the selectively retrieved historic information to a futures predicting engine which generates predictions of future economic behaviors based on automatically obtained, current economic predictor factors and the selectively retrieved historic information; and (c) automatically generating from the predictions of future economic behaviors query results which indicate future time points at which more and/or better search results are expected to be available in response to the economically-directed search query.

2. The machine-implemented method of claim 1 wherein said search query is a job search query containing the seeker's qualifications for a given job.

3. The machine implemented method of claim 2 wherein said search query includes a job title description.

4. The machine implemented method of claim 2 wherein said query includes a specification of a business category desired by the seeker.

5. The machine implemented method of claim 2 where said search query includes a location indicator indicating one or more desired locations for the job requested by the seeker.

6. The machine implemented method of claim 1 and further comprising:

(d) using the query results to automatically generate a search results report that contains both currently matching results for the submitted economically-directed search query and an indication of when said more and/or better search results are to be expected.

7. The machine implemented method of claim 6 wherein: said indication of when more and/or better search results are to be expected includes a projected count of number of jobs expected in predefined business categories.

8. The machine implemented method of claim 6 wherein: said indication of when more and/or better search results are to be expected includes a projected count of number of jobs expected in predefined job locations.

9. The machine implemented method of claim 6 wherein: said indication of when more and/or better search results are to be expected includes a projected count of number of jobs expected in predefined time slots.

10. A network-accessible job match computer system, comprising:

(a) an economically-directed history database structured to receive query parameters from a user's search query and to responsively selectively retrieve economically-directed historic information corresponding to the received query parameters, said retrieved information being useful for generating a prediction of future economic activity corresponding to the received query parameters;

(b) a futures predicting engine coupled to the history database to receive the retrieved economically-directed historic information and to generate as a function of said retrieved economically-directed historic information, a prediction of future economic behavior; and (c) a report generator, coupled to the futures predicting engine and structured to automatically generate from the prediction of future economic behavior query results which indicate one or more future time points at which increased economic activity is expected corresponding to the economically-directed search query.

11. The network-accessible job match computer system of claim 10 wherein:
said economically-directed history database stores user search queries earlier submitted by other users.

12. The network-accessible job match computer system of claim 10 wherein:
said futures predicting engine gathers and uses current leading economic predictor factors for generating its respective prediction of future economic behavior; and
said economically-directed history database stores second leading economic predictor factors that are earlier dated but of the same kind as the current economic predictor factors gathered and used by said futures predicting engine.

13. The network-accessible job match computer system of claim 10 wherein:
said economically-directed history database stores job postings submitted to the job match computer system by job offerors.

14. The network-accessible job match computer system of claim 10 wherein:
said economically-directed history database stores economically-directed history information.

15. The network-accessible job match computer system of claim 10 wherein:
said futures predicting engine gathers current leading economic predictor factors and said futures predicting engine uses curve fitting combined with the gathered current leading economic predictor factors for generating its respective prediction of future economic behavior.

16. The network-accessible job match computer system of claim 10 wherein:
said report generator generates a current economic activity report corresponding to the economically-directed search query, where the generated current economic activity report is logically coupled with said query results which indicate one or more future time points at which increased economic activity is expected.

17. The network-accessible job match computer system of claim 10 and further comprising:

(d) an accumulator, operatively coupled to the report generator for accumulating said indications of future time points at which increased economic activity is expected for different categories of search query qualifications and/or for respective industry sectors.

18. The network-accessible job match computer system of claim 17 and further comprising:

(e) a surge report generator, operatively coupled to the accumulator, for generating reports indicating when revisiting query submitters are expected to revisit the job match computer system.

19. The network-accessible job match computer system of claim 10 and further providing a What is here now and in the future function to users who have a location aware access device.

* * * * *